United States Patent [19]

Kang et al.

[11] 4,188,460
[45] Feb. 12, 1980

[54] INTERNAL BATTERY FUSE

[75] Inventors: Hong Y. Kang, Newton; Per Bro, Andover, both of Mass.

[73] Assignee: P. R. Mallory & Co., Inc., Indianapolis, Ind.

[21] Appl. No.: 901,404

[22] Filed: May 1, 1978

[51] Int. Cl.² ............................................ H01M 2/34
[52] U.S. Cl. ...................................................... 429/7
[58] Field of Search ............... 429/1, 7, 62; 337/142, 337/158, 166

[56] References Cited

U.S. PATENT DOCUMENTS

| 2,876,271 | 3/1959 | Cahoon | 429/7 |
| 3,445,798 | 5/1969 | Lohrmann | 337/166 |
| 3,885,991 | 5/1975 | Finkel | 429/1 |
| 4,011,366 | 3/1977 | Bones et al. | 429/7 |
| 4,035,552 | 7/1977 | Epstein | 429/7 |

Primary Examiner—Donald L. Walton
Attorney, Agent, or Firm—Ronald S. Cornell; Israel Nissenbaum; Martin M. Glazer

[57] ABSTRACT

An internal battery fuse comprising a portion of a current collector which is thermally shielded whereby excessive built-up heat resulting from a short circuit is concentrated in said portion and which heat fuses the shielded portion and interrupts the circuit prior to excessive internal pressure conditions.

7 Claims, 1 Drawing Figure

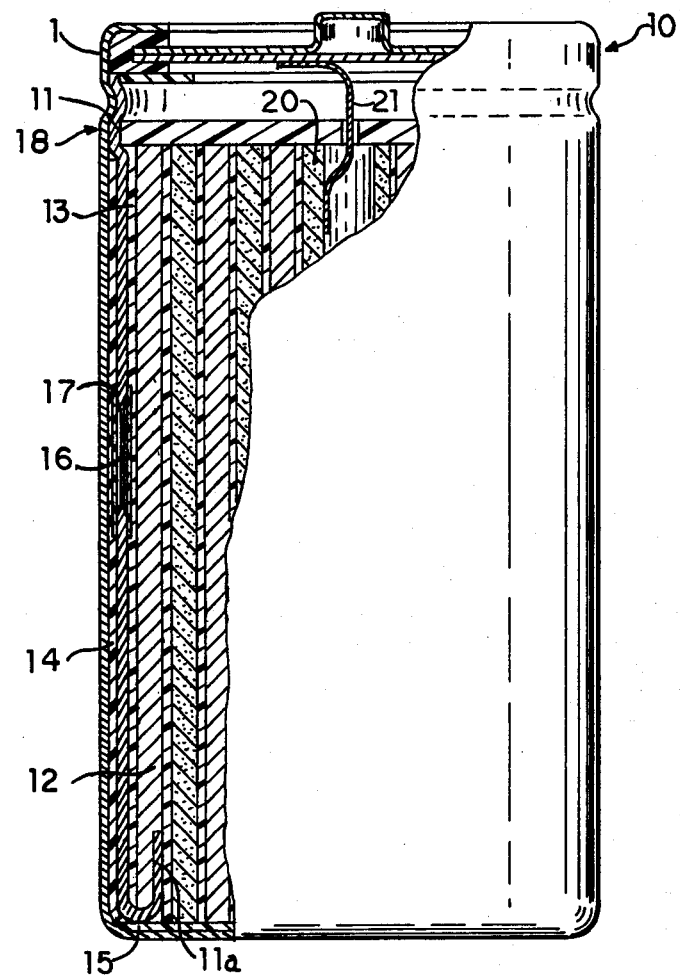

INTERNAL BATTERY FUSE

This invention relates to electrochemical cells subject to internal temperature rise and excessive internal pressure build-up upon short circuiting and more particularly to lithium/sulfur dioxide cells having such characteristics.

One of the dangers of cells having high discharge rate capabilities is that a short circuit can result in a rapid rise in temperature within the cell caused by ohmic energy dissipation with concomitant increase in pressure. With such increase in pressure, cells may either explode violently or at the very least open and expel their corrosive contents.

Various expedients have been utilized in preventing the above-mentioned consequences in cells when short circuited. Included in such expedients are thermally responsive elements whereby mechanical or electrical means are used to break the circuit and prevent further untoward consequences. Among such thermal control elements are external fuses, diodes, electrically responsive cut off switches, low temperature melting solder connections and the like. However, the aforementioned control devices have the disadvantage in that they require elements which are normally not included with or within the cells thereby reducing useful available volumetric space and additionally are for the most part costly in implementation.

It is therefore an object of the present invention to provide a means whereby an integral element within a cell can function as a temperature responsive fuse for preventing untoward consequences resulting from short circuit conditions.

This and other objects, features and advantages will be more clearly seen from the following discussion as well as from the drawing in which the single FIGURE is a partially sectioned elevation view of an electrochemical cell containing the temperature responsive means of the present invention.

Generally stated the present invention involves the use of a portion of a normally disposed metal current collector, whether attached to the anode or the cathode in an electrochemical cell, as a fuse in preventing excessive temperature and pressure rise resulting from short circuit conditions.

Normally, a current collector will not fuse under short circuit conditions in sufficient time if at all for excessive pressure build-up to be prevented. Fusion of the current collector does not occur because heat built up therein is dissipated through the cell usually by convection currents in the liquid electrolyte caused by the heating of the current collector. In accordance with the present invention a section of the current collector of a suitable size able to retain enough heat to fuse the current collector is enclosed by a thermal shield. Heat is thereby contained therein and quickly fuses the current collector and interrupts the circuit before excessive pressure conditions occur. The thermal shield functions in a manner whereby heat conduction from the current collector is substantially diminished by preventing the electrolyte from conducting heat (directly or indirectly) from the current collector at the fusing site. With respect to the fusing site it is important that such site be situated between the point or points at which the current collector is attached for external terminal connection and the points or points at which the current collector is electrically connected to the electrode so that the circuit is interruptable.

The thermal shield may either be a separate thermally insulative material such as plastic including polyolefins such as polyethylene or polypropylene heat sealed around the fusing site or the cell separator itself if made of a similarly thermally insulative material and sufficiently tightly contacted with the fusing site to prevent thermal contact between the fusing site and the cell electrolyte. Heat sealable films of polyethylene and polypropylene are commercially available in various thicknesses ranging from 0.001 to 0.01 inch. Thicknesses of 0.001 and 0.002 inch polyethylene are satisfactory and will adequately shield the fusing site. Heat sealing of polyethylene or polypropylene film to the metal current collector is preferably done by light, localized pressure by heated platens.

In order for a section of the current collector to properly function as a fuse it should be dimensioned such that the desired fusing current provides sufficient resistance heat to fuse the current collector in air. It is desirable to thin the section of the current collector, which is to function as a fuse, to such dimensions. A current collector having uniform thinned dimensions throughout is less desirable because of the loss of structural integrity engendered thereby. Factors to be considered in determining the dimensions of the section to be fused include the resistance, density and melting point of the metal used. Table I indicates some width dimensions for fusing strips of various metals commonly used as current collectors:

TABLE I

Heat Generated Compared to Fusing Heat of Fusing Strips (0.5" long - 0.002" thick)

| Metal | Width inch | Width cm | Cross Section $cm^2$ | Weight gms | Resist. ohms | Heat req. to fuse joules | Heat generated by 10A. sec joules |
|---|---|---|---|---|---|---|---|
| Al | .010 | .0254 | .00013 | $3.51 \times 10^{-4}$ | $2.05 \times 10^{-2}$ | 0.304 | 2.05 |
|  | .015 | .0381 | .00019 | $5.13 \times 10^{-4}$ | $1.40 \times 10^{-2}$ | 0.444 | 1.40 |
|  | .020 | .0508 | .00026 | $7.02 \times 10^{-4}$ | $1.03 \times 10^{-2}$ | 0.608 | 1.03 |
|  | .025 | .0635 | .00032 | $8.64 \times 10^{-4}$ | $0.83 \times 10^{-2}$ | 0.748 | 0.83 |
| Cu | .010 | .0254 | .00013 | $1.16 \times 10^{-3}$ | $1.32 \times 10^{-2}$ | 0.683 | 1.32 |
|  | .015 | .0381 | .00019 | $1.60 \times 10^{-3}$ | $0.90 \times 10^{-2}$ | 1.00 | 0.90 |
|  | .020 | .0508 | .00026 | $2.32 \times 10^{-3}$ | $0.66 \times 10^{-2}$ | 1.37 | 0.66 |
|  | .025 | .0635 | .00032 | $2.86 \times 10^{-3}$ | $0.54 \times 10^{-2}$ | 1.68 | 0.54 |
| Ni | .010 | .0254 | .00013 | $1.16 \times 10^{-3}$ | $5.57 \times 10^{-2}$ | 1.09 | 5.57 |
|  | .015 | .0381 | .00019 | $1.69 \times 10^{-3}$ | $3.81 \times 10^{-2}$ | 1.58 | 3.81 |
|  | .020 | .0508 | .00026 | $2.31 \times 10^{-3}$ | $2.78 \times 10^{-2}$ | 2.16 | 2.78 |
|  | .025 | .0635 | .00032 | $2.85 \times 10^{-3}$ | $2.26 \times 10^{-2}$ | 2.68 | 2.26 |
| Ti | .010 | .0254 | .00013 | $5.85 \times 10^{-4}$ | 0.262 | 0.887 | 26.2 |
|  | .015 | .0381 | .00019 | $8.35 \times 10^{-4}$ | 0.179 | 1.30 | 17.9 |
|  | .020 | .0508 | .00026 | $1.17 \times 10^{-3}$ | 0.131 | 1.77 | 13.1 |

TABLE I-continued

Heat Generated Compared to Fusing Heat of Fusing Strips
(0.5" long - 0.002" thick)

| Metal | Width inch | Width cm | Cross Section cm² | Weight gms | Resist. ohms | Heat req. to fuse joules | Heat generated by 10A. sec joules |
|---|---|---|---|---|---|---|---|
| | .025 | .0635 | .00032 | $1.44 \times 10^{-3}$ | 0.106 | 2.18 | 10.6 |

Note from Table I that copper requires the smallest widths for fusing making it more difficult to handle as a current collector and therefore is least desirable as a fuse metal. Titanium can have the greatest width and still fuse and would therefore be the most preferred except for its high cost. As between nickel and aluminum, nickel is preferred as a fuse metal because of its greater mechanical strength when in thin strip form. In all instances compatibility between the electrode and the metal of the current collector associated therewith is however the determining factor in selecting a suitable metal for the current collector. Note that if desired, the fuse site metal may be different from that of the rest of the current collector and may be welded to the current collector between sections thereof.

In determining currents at which aluminum and nickel fuse, in cells having heat conductive electrolytes, when such cells are short circuited wires of aluminum and nickel of varying cross sections are immersed in electrolyte solutions of sulfur dioxide used as a cathode depolarizer in acetonitrile and subjected to various current loads. Table II indicates the results of such tests with a comparison between shielded and unshielded metals in solutions as compared to unshielded metals in air:

TABLE II (0.5 inch lengths)

| Current Collector | Cross Section | Environment | Thermal Shield | Current at Which fused | Time to Fuse |
|---|---|---|---|---|---|
| Al#36 AWG 1 Strand | $(1.27 \times 10^{-4} cm^2)$ | Air | No | 5 amp | 1 sec |
| Al#36 AWG 1 Strand | " | Sol'n | No | 20 amp | 2 sec |
| Al#36 AWG 1 Strand | " | Sol'n | Yes | 5 amp | 2 sec |
| Al#36 AWG 2 Strand | $(2.54 \times 10^{-4} cm^2)$ | Air | No | 10 amp | 2 sec |
| Al#36 AWG 2 Strand | " | Sol'n | No | 25 amp | 2 sec |
| Al#36 AWG 4 Strand | $(5.08 \times 10^{-4} cm^2)$ | Air | No | 15 amp | 2 sec |
| Al#36 AWG 4 Strand | " | Sol'n | No | 25 amp | No fusing |
| Al#36 AWG 4 Strand | " | Sol'n | Yes | 20 amp | 2 sec |
| Ni#40 AWG 4 Strand | $(2.0 \times 10^{-4} cm^2)$ | Air | No | 5 amp | 2 sec |
| Ni#40 AWG 4 Strand | " | Sol'n | No | 20 amp | 2 sec |
| Ni #40 AWG 4 Strand | " | Sol'n | Yes | 5 amp | 2 sec |
| Ni#40 AWG 8 Strand | $(4.0 \times 10^{-4} cm^2)$ | Air | No | 10 amp | 2 sec |
| Ni#40 AWG 8 Strand | " | Sol'n | No | 25 amp | 3 sec |
| Ni#40 AWG 8 Strand | " | Sol'n | Yes | 10 amp | 4 sec |
| Ni#40 AWG 12 Strand | $(6.0 \times 10^{-4} cm^2)$ | Air | No | 15 amp | 2 sec |
| Ni#40 AWG 12 Strand | " | Sol'n | No | 25 amp | No fusing |
| Ni#40 AWG 12 Strand | " | Sol'n | Yes | 15 amp | 2 sec |

By shielding the metal in solution, results comparable to metals in air with respect to fusing capability are obtained. It should be further noted that though the comparisons were conducted with sulfur dioxide in acetonitrile solutions similar results are expected regardless of the electrolyte solution composition.

The placement and configuration of the internal fuse of the present invention can be more clearly seen with reference to the drawing in which electrochemical cell 10 is shown as having a spirally wound electrode/separator configuration. (The electrode configuration is however, generally immaterial to the operation of the present invention unless the separator is to be used as the thermal shield.) Section 11a of nickel current collector 11 extends beneath polypropylene separator 13 and electrically engages lithium anode 12 and is the only point of electrical connection between current collector 11 and anode 12 with separator 13 electrically insulating the rest of current collector 11 from anode 12. Thinned strip section 16 with thermally non-conductive shield 17 functions as the thermally responsive fuse. Shield 17 is made of a material such as polyethylene and is heat sealed around section 16 in order to retain heat in said section during short circuit heat build-up conditions. If the current collector 11 with fusing site 16 is tightly pressed against separator 13 and insulative member 14 whereby the sulfur dioxide cathode depolarizer in acetonitrile electrolyte is excluded from thermal contact with section 16, shield member 17 may be dispensed with, with the separator 13 and insulative member 14 functioning as the thermal shield.

Current collector 11 makes external terminal connection with the cell container 1 above insulative member 14 at area 18 of the cell container 1. Below area 18 and particularly between section 16 and the contact area of current collector 11 and anode 12, insulative members 14 and 15 prevent external electrical connection between current collector 11 and cell container 1. Such insulation prevents completed electrical connection even when section 16 fuses.

Should a short circuit condition occur, heat is concentrated in section 16 of the current collector 11, particularly since the thinned section provides a greater electrical resistance. The heat contained fuses section 16 with the short circuit electrical connection being interrupted thereby, prior to excessive internal cell heat build-up and concomitant excessive pressure. Section 16 is preferably dimensioned to fuse at a 5 amp current load.

In a similar manner aluminum cathode current collector 21 for carbonaceous cathode 20 can function as the internal cell fuse by wrapping a portion thereof with a thermal shield and suitably dimensioning the fusing site.

It is understood that changes and variations in cell construction, current collector configuration, fusing site and thermal shielding and the like can be made without departing from the scope of the present invention as defined in the following claims.

What is claimed is:

1. An electrochemical cell comprising a container containing a first electrode, a second electrode, liquid electrolyte and one or more current collectors electrically connected to at least one of said electrodes with said current collector electrically engaged with a section of said container characterized in that a portion of said current collector between said electrical connection and electrical engagement is enclosed by thermal shielding means and said enclosed portion is immersed in said electrolyte whereby excessive heat generated by ohmic dissipation within said current collector caused by a short circuit of said cell is retained within said enclosed portion to fuse said portion and interrupt the circuit.

2. The cell of claim 1 wherein said portion of said current collector is of a smaller cross section than the remainder of said current collector.

3. The cell of claim 2 wherein said thermal shielding means comprises a heat sealed film comprised of a polyolefin selected from the group consisting of polyethylene and polypropylene.

4. The cell of claim 1 wherein said first electrode is comprised of lithium.

5. The cell of claim 4 wherein said electrolyte includes sulfur dioxide dissolved therein as a cathode depolarizer.

6. The cell of claim 1 wherein portion is dimensioned such that it fuses when subjected to a current of 5 amperes.

7. The cell of claim 1 wherein said current collector comprises a metal selected from the group consisting of nickel and aluminum.

* * * * *